No. 765,452. PATENTED JULY 19, 1904.
K. ANDERSSON.
SPEED REGULATOR FOR STEAM TURBINES.
APPLICATION FILED OCT. 9, 1903.
NO MODEL. 2 SHEETS—SHEET 1.
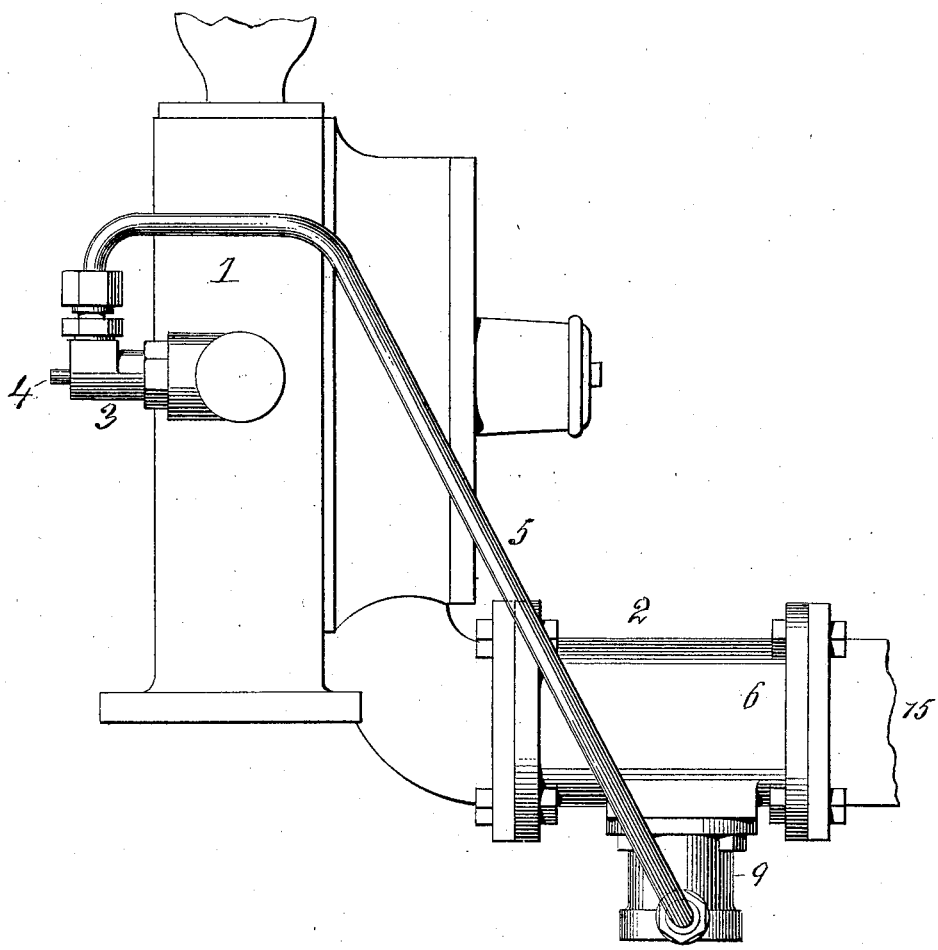

No. 765,452. PATENTED JULY 19, 1904.
K. ANDERSSON.
SPEED REGULATOR FOR STEAM TURBINES.
APPLICATION FILED OCT. 9, 1903.
NO MODEL. 2 SHEETS—SHEET 2.
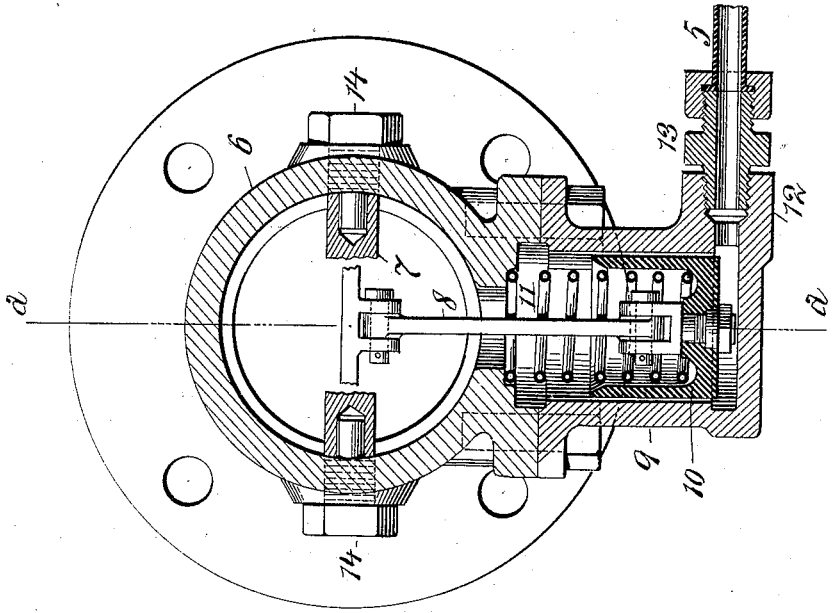
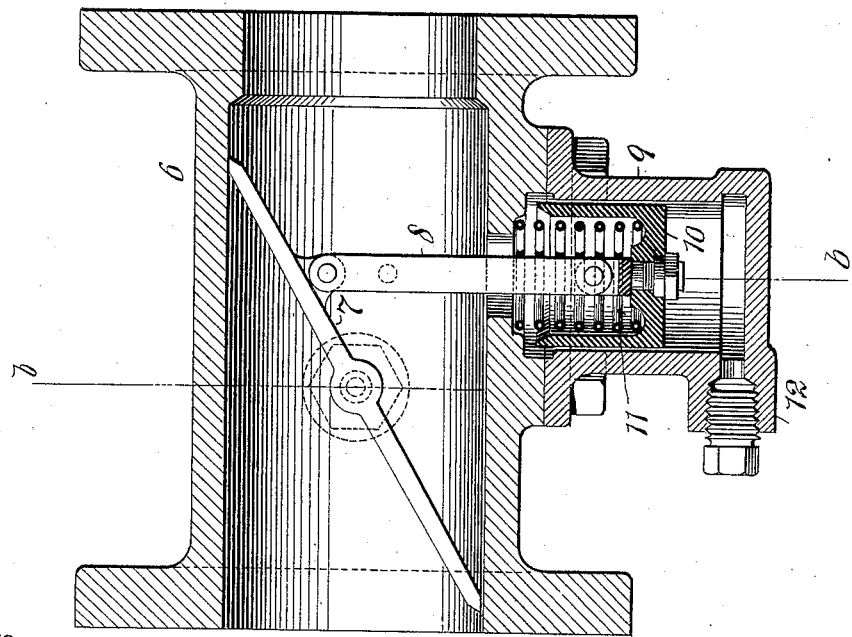
WITNESSES:
Gustave Dietrich
Edwin H. Dietrich
INVENTOR
Konrad Andersson
BY Park Benjamin
his ATTORNEY No. 765,452. Patented July 19, 1904.

UNITED STATES PATENT OFFICE.

KONRAD ANDERSSON, OF LEEDS, ENGLAND.

SPEED-REGULATOR FOR STEAM-TURBINES.

SPECIFICATION forming part of Letters Patent No. 765,452, dated July 19, 1904.

Application filed October 9, 1903. Serial No. 176,434. (No model.)

*To all whom it may concern:*

Be it known that I, KONRAD ANDERSSON, of Leeds, England, have invented a new and useful Improvement in Speed-Regulators for Steam-Turbines, of which the following is a specification.

The invention relates to the apparatus for controlling the speed of steam-turbines set forth in United States Patent, No. 705,124, granted to G. O. M. Olsson, July 22, 1902; and it consists in an improved device for controlling the cut-off valve located in the steam-exhaust pipe between the condenser and wheel-chamber, whereby steam may be imprisoned in said chamber to offer resistance to the rotation of the wheel, and so check undue increase of speed.

In the accompanying drawings, Figure 1 is a side elevation view of wheel-chamber and exhaust-pipe. Fig. 2 is a section of my valve-controlling device on the line $a$ $a$ of Fig. 3, showing positions of parts with the cut-off valve closed; and Fig. 3 is a section on the line $b$ $b$ of Fig. 2, showing positions of parts with the cut-off valve open.

Similar numbers of reference indicate like parts.

Referring to Fig. 1, 1 is the inclosing casing of a steam-turbine. 2 is the exhaust-pipe, having one end connected, as shown, to said casing and communicating at its other end, 15, with any suitable form of condenser. 3 is an air-valve normally closed by a spring, but opened by inward pressure upon its stem 4 to admit air into the wheel-casing. The construction and arrangement of turbine casing and condenser, of the exhaust-pipe, air-valve, and throttling devices connected therewith are the same as set forth in the aforesaid Letters Patent, No. 705,124. Said patent also shows a pipe 20 leading from the air-valve to the controlling device, and to this the pipe 5 in Fig. 1 corresponds; but the construction and arrangement of the controlling device in my present invention and the relation of pipe 5 thereto is different. In the exhaust-pipe 2 is a pipe-section 6, in which is the cut-off valve 7, supported on side pivots 14. In the wall of said section is an opening which communicates with the interior of the cylinder 9, secured to said wall. In the cylinder 9 is the cup-shaped plunger-piston 10, which is connected to the valve 7 by the link 8. Within the plunger 10 and bearing thereon and upon a shoulder which may be formed in the pipe-section is a helical spring 11, the effect of which is normally to move the plunger outwardly in the cylinder, and so hold the valve 7 in open position, as represented in Fig. 3. In the cylinder 9 beyond the plunger there is an opening having an internally-threaded connection 12, to which the pipe 5, leading from the air-valve 3, may be secured by any suitable form of screw-coupling, as shown at 13, Fig. 3. There is a small clearance around the plunger 10 and between the same and the inclosing cylinder-wall.

As fully explained in Letters Patent No. 705,124, an increase of speed of the turbine-wheel beyond some predetermined amount causes, in the apparatus there shown, a regulator to close the throttle-valve, and so shut off steam from the wheel. If, however, for any cause there is a leakage of steam past the throttle the wheel is apt to go to still higher speed. The effect then is to cause the regulator to open the air-valve (here represented at 3) by pushing in the stem 4. Then the air enters the pipe 5, communicating with the controlling device for the cut-off valve, the operation of which is as follows: Normally, as already stated, the valve 7 is held open by the expansion of the helical spring 11. A vacuum, due to the condenser, exists on both sides of the plunger 10 by reason of the clearance of said plunger in its cylinder. When air is admitted through the pipe 5 to the cylinder, then the plunger 10 is moved inwardly against the action of the spring until it takes the position shown in Fig. 2, so closing the valve 7. The steam within the turbine-casing thus becomes imprisoned and forms a resisting medium to the movement of the wheel, which soon reduces the speed thereof.

In the device of Letters Patent No. 705,124 the pipe leading from the air-valve connects to the piston-cylinder and also to the exhaust-pipe between cut-off valve and cylinder. The vacuum produced under the piston causes it to be held open by the normal pressure on the other side exerted against the action of its spring, so that as soon as balancing pressure is obtained through the air-pipe the spring closes the cut-off valve. In my device the air-pipe 5 does not connect with the exhaust-pipe, but with the plunger-cylinder. The normal expansion of the spring acting on the plunger holds the cut-off valve open, since by reason of the clearance there is vacuum on both sides of the plunger. The admission of air to the plunger-cylinder causes a direct pressure on one side of the plunger, which closes the valve. The action of my device is therefore more certain and positive. The construction is also simplified, since the plunger is arranged in a cylinder so applied to the exhaust-pipe that the connecting-link passes through the pipe-wall and is attached directly to the cut-off valve instead of exteriorly to the valve-pivot, and the extension of the air-pipe and the means for connecting the same to the exhaust-pipe are wholly done away with.

I claim—

1. The combination of a steam turbine-wheel, a vacuum-chamber inclosing the same having a steam-inlet and an outlet-conduit through which the steam is exhausted from said chamber, a valve in said outlet-conduit, a cylinder, a piston therein controlling said valve, a spring acting on one side of said piston, means for producing a vacuum on both sides of said piston and permitting said spring to expand and actuate said piston to open said valve, and means for causing pressure on one side of said piston to compress said spring and close said valve; the said last-named means being actuated by said turbine-wheel after it has attained a certain predetermined speed, substantially as described.

2. In combination with the inclosing casing of a steam-turbine, means for reducing pressure therein, an exhaust-pipe connecting said casing and said means, and a cut-off valve in said pipe, a cylinder, a piston therein connected to said valve, a spring acting on one side of said piston, and means for applying pressure to said piston to compress said spring and close said valve; the said cylinder communicating with said pressure-reducing means on both sides of said piston, substantially as described.

3. In combination with the turbine-wheel-casing exhaust-pipe and means for reducing pressure in said pipe and casing, the valve 7 in said pipe, cylinder 9 opening at one end into said pipe, cup-shaped piston 10 fitting with circumferential clearance in said cylinder, link 8 connecting said piston to said valve, spring 11 in said piston bearing against the same and an abutment and acting to move said piston to open said valve, and means controlled by the speed of said wheel for admitting air into said cylinder to compress said spring and close said valve, substantially as described.

In testimony whereof I have signed my name to this specification in the presence of two subscribing witnesses.

KONRAD ANDERSSON.

Witnesses:
WALDEMAR BOMAN,
T. EKEBOHM.